United States Patent
Dill

(10) Patent No.: US 11,241,991 B2
(45) Date of Patent: *Feb. 8, 2022

(54) ANTI-ROLL OVER TRAILER

(71) Applicant: Blake Dill, Abilene, TX (US)

(72) Inventor: Blake Dill, Abilene, TX (US)

(73) Assignee: DCB Trailer Design, LLC, Hawley, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,085

(22) Filed: Aug. 28, 2019

(65) Prior Publication Data

US 2019/0381927 A1    Dec. 19, 2019

Related U.S. Application Data

(63) Continuation-in-part of application No. 15/400,783, filed on Jan. 6, 2017, now Pat. No. 10,435,089.

(60) Provisional application No. 62/789,572, filed on Jan. 8, 2019.

(51) Int. Cl.
| | | |
|---|---|---|
| *B60P 3/22* | (2006.01) | |
| *B60P 3/24* | (2006.01) | |
| *B60S 9/02* | (2006.01) | |
| *B62D 53/08* | (2006.01) | |
| *B62D 53/06* | (2006.01) | |

(52) U.S. Cl.
CPC ............. *B60P 3/2205* (2013.01); *B60P 3/24* (2013.01); *B60S 9/02* (2013.01); *B62D 53/0842* (2013.01); *B60P 3/2225* (2013.01); *B60Y 2200/147* (2013.01); *B62D 53/06* (2013.01)

(58) Field of Classification Search
CPC ......... B60P 3/2205; B60P 3/24; B60P 3/2225; B62D 53/0842; B62D 53/06; B60S 9/02; B60Y 2200/147
USPC ...................................... 296/182.1
See application file for complete search history.

(56) References Cited

U.S. PATENT DOCUMENTS

| | | | |
|---|---|---|---|
| 2,339,303 | A | 1/1944 | William |
| 3,880,438 | A | 4/1975 | Klein |
| 3,883,148 | A | 5/1975 | Miller |
| 4,331,342 | A | 5/1982 | van der Lely |
| 5,593,070 | A | 1/1997 | Steadman |
| 5,782,493 | A | 7/1998 | Bolton et al. |
| 6,394,533 | B1 | 5/2002 | Ladell |
| 8,523,232 | B2 | 9/2013 | DeLaRosa, II et al. |
| 8,801,040 | B2 * | 8/2014 | Thomas .................. B60P 3/221 280/837 |

(Continued)

FOREIGN PATENT DOCUMENTS

| | | |
|---|---|---|
| CN | 202806522 U | 3/2013 |
| JP | 2007099192 A | 4/2007 |
| JP | 2013184725 A | 9/2013 |

*Primary Examiner* — D Glenn Dayoan
*Assistant Examiner* — Dana D Ivey
(74) *Attorney, Agent, or Firm* — Hubbard Johnston, PLLC

(57) ABSTRACT

A trailer configured to lower an overall center of gravity. The trailer comprises a tank, a wheel assembly, an upper body height and a trailer length. The tank comprises a cavity contained within a lower body, an upper body, a transitioning body, a front end and a rear end when the cavity within the trailer is filled with a liquid fluid, the liquid fluid is evenly distributed along the trailer length of the trailer since a diameter of the lower body, the upper body and the transitioning body are equal.

19 Claims, 8 Drawing Sheets

(56) References Cited

U.S. PATENT DOCUMENTS 10,435,089 B2 * 10/2019 Dill ...................... B60P 3/2205
2016/0193950 A1 7/2016 Kibler

* cited by examiner

ANTI-ROLL OVER TRAILER

CROSS-REFERENCE TO RELATED APPLICATIONS

This application is a continuation in part of U.S. patent application Ser. No. 15/400,783 filed on 2017 Jan. 6. Relevant also is U.S. Patent Application No. 62/789,572 filed on 2019 Jan. 8. Both above cited applications have the same applicant and inventor, and both are with this application.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

All prior art known to the Applicant can be found in the examiner's citations for U.S. patent application Ser. No. 15/400,783 (the parent application for this filing) including U.S. Pat. No. 8,523,232B2, and U.S. Pat. No. 6,394,533B1.

BRIEF SUMMARY OF THE INVENTION

A trailer 100 configured to lower an overall center of gravity 306. Said trailer 100 comprises a tank 102, a wheel assembly 114, an upper body height 130 and a trailer length 132. Said tank 102 comprises a cavity 400 contained within a lower body 104, an upper body 106, a transitioning body 108, a front end 110 and a rear end 112. Said tank 102 comprises a lower center of gravity 302, an upper center of gravity 304, and said overall center of gravity 306. Said lower body 104 comprises a lower body height 136, a lower body length 138, a lower body ground clearance 144, and said lower center of gravity 302. Said upper body 106 comprises an upper body length 142, an upper body ground clearance 134, said upper body height 130 and said upper center of gravity 304. Said tank 102 comprises said trailer length 132, a tank height 148 equal to said upper body height 130 of said upper body 106, and a tank ground clearance 150 equal to said lower body ground clearance 144. Said transitioning body 108 comprises a transitioning body length 140. Said cavity 400 configured to contain one or more fluids 408. Said lower body height 136 of said lower body 104 is lower than said upper body height 130 of said upper body 106. Said transitioning body 108 connects said upper body 106 and said lower body 104. Said upper body ground clearance 134 is a minimum height 152 to selectively mate with a vehicle 800. Said transitioning body 108 is inclined to connect said upper body 106 and said lower body 104. Said lower body 104 and said upper body 106 are substantially horizontal. Said lower body 104, said upper body 106 and said transitioning body 108 each comprise a round cross-section 608 having a width 600. Said width 600 of said lower body 104, said upper body 106 and said transitioning body 108 are equal. when said cavity 400 within said trailer 100 is filled with a liquid fluid 408b, said liquid fluid 408b is evenly distributed along said trailer length 132 of said trailer 100 since a diameter 610 of said lower body 104, said upper body 106 and said transitioning body 108 are equal.

Said trailer 100 configured to lower said overall center of gravity 306. Said trailer 100 comprises said tank 102, said wheel assembly 114, said upper body height 130 and said trailer length 132. Said tank 102 comprises said cavity 400 contained within said lower body 104, said upper body 106, said transitioning body 108, said front end 110 and said rear end 112. Said tank 102 comprises said lower center of gravity 302, said upper center of gravity 304, and said overall center of gravity 306. Said lower body 104 comprises said lower body height 136, said lower body length 138, said lower body ground clearance 144, and said lower center of gravity 302. Said upper body 106 comprises said upper body length 142, said upper body ground clearance 134, said upper body height 130 and said upper center of gravity 304. Said tank 102 comprises said trailer length 132, said tank height 148 equal to said upper body height 130 of said upper body 106, and said tank ground clearance 150 equal to said lower body ground clearance 144. Said transitioning body 108 comprises said transitioning body length 140. Said cavity 400 configured to contain said one or more fluids 408. Said lower body height 136 of said lower body 104 is lower than said upper body height 130 of said upper body 106. Said transitioning body 108 connects said upper body 106 and said lower body 104. Said upper body ground clearance 134 is said minimum height 152 to selectively mate with said vehicle 800. Said transitioning body 108 is inclined to connect said upper body 106 and said lower body 104. Said lower body 104 and said upper body 106 are substantially horizontal. when said cavity 400 within said trailer 100 is filled with said liquid fluid 408b, said liquid fluid 408b is evenly distributed along said trailer length 132 of said trailer 100 since said diameter 610 of said lower body 104, said upper body 106 and said transitioning body 108 are equal.

DETAILED DESCRIPTION OF THE INVENTION

Figure 1A:
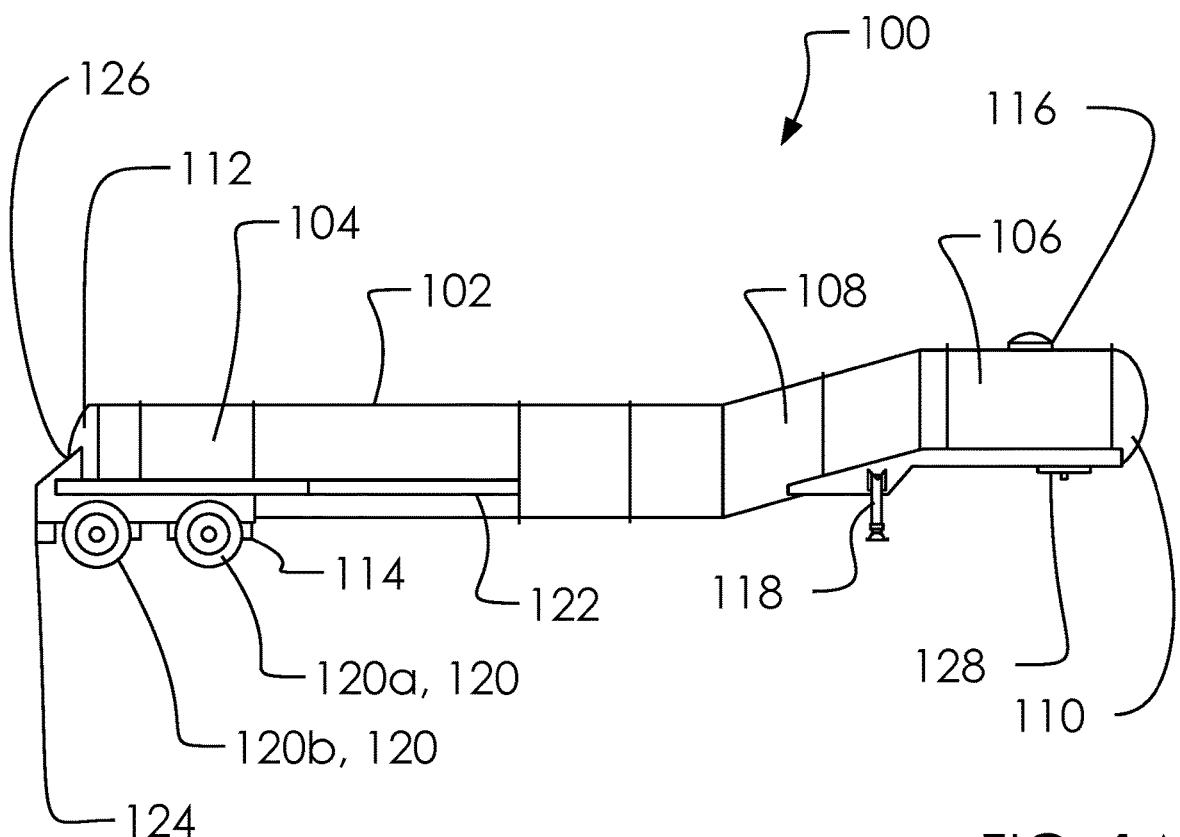
FIGS. 1A and 1B illustrate an elevated first side view of a trailer 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

PARTS LIST a trailer 100, a tank 102, a lower body 104, an upper body 106, a transitioning body 108, a front end 110, a rear end 112, a wheel assembly 114, a portal 116, one or more legs 118, a first leg 118a, a second leg 118b, a plurality of wheels 120, a first wheel 120a, a second wheel 120b, a rear wheel fender 122, a rear bumper 124, a drain portal 126, a kingpin assembly 128, an upper body height 130, a trailer length 132, an upper body ground clearance 134, a lower body height 136, a lower body length 138, a transitioning body length 140, an upper body length 142, a lower body ground clearance 144, an incline angle 146, a tank height 148, a tank ground clearance 150, a minimum height 152, a plurality of bands 202, a first support band 202a, a second support band 202b, a third support band 202c, a fourth support band 202d, a fifth support band 202e, a sixth support band 202f, a seventh support band 202g, a plurality of sections 206, a first section 206a, a second section 206b, a third section 206c, a fourth section 206d, a fifth section 206e, a sixth section 206f, a seventh section 206g, a eight section 206h, a ninth section 206k, a lower center of gravity 302, an upper center of gravity 304, an overall center of gravity 306, a cavity 400, a lower cavity 402, an upper cavity 404, a transitioning cavity 406, one or more fluids 408, a gas fluid 408a, a liquid fluid 408b, a lower fluid 410, an upper fluid 412, a transitioning fluid 414, a lower cavity volume 416, an upper cavity volume 418, a transitioning cavity volume 420, a width 600, a height 602, a height 604, a lateral center of gravity 606, a round cross-section 608, a diameter 610 and a vehicle 800.

Figure 1B:
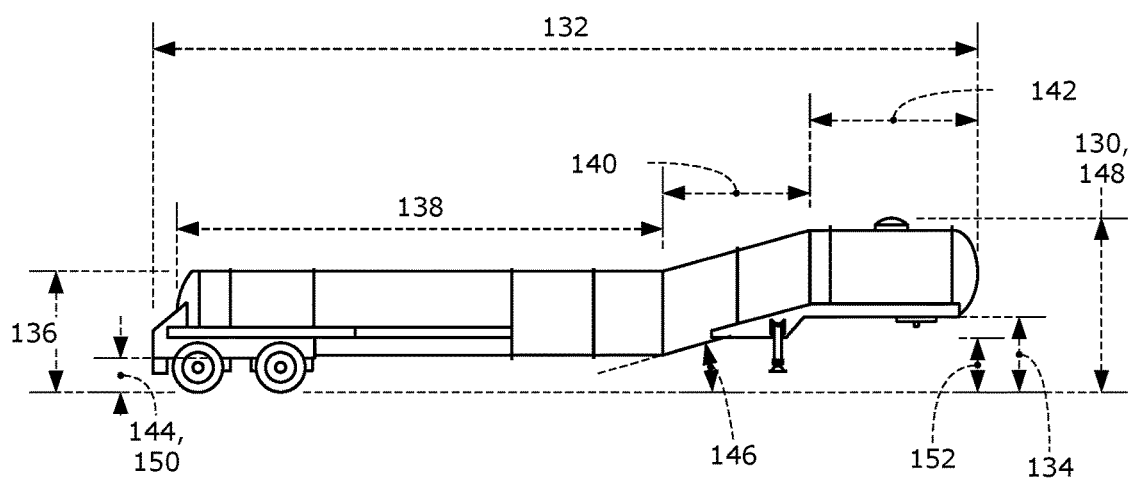

FIGS. 1A and 1B illustrate an elevated first side view of said trailer 100.

In one embodiment, said transitioning body 108 (having a higher center of gravity) which can be connected to said front end 110 can be positioned at the forward end of said trailer 100 to close off said cavity 400. Said transitioning body 108 can be a substantial cylinder shaped and can be hollow to form a portion of said cavity 400 and can include a fill said portal 116 to allow fluid to be input into said cavity 400. Said cavity 400 can extend for the entire length of said trailer 100 or have separate partitions.

Said lower body 104 (having a lower center of gravity) can be a cylinder or other shape as known in the art; wherein, said lower body 104 can include a portion of said cavity 400 and can be substantially horizontal and positioned at the same angle as said transitioning body 108.

Said rear end 112 can include said drain portal 126 to drain said cavity 400 and said rear end 112 can be connected to said rear bumper 124.

In one embodiment, said lower body length 138 is greater than said upper body length 142, as illustrated. Accordingly, the volume within of said tank 102 is substantially contained within said lower body 104.

In one embodiment, said upper body ground clearance 134 is said minimum height 152 to accommodate standard vehicles and to mate with a trailer hitch system of such vehicles, as is known in the art.

In one embodiment, said lower body 104 can be configured minimize said lower body ground clearance 144 to the fullest extent possible while ensuring said tank 102 passes all safety codes and government requirements for said lower body ground clearance 144. Accordingly, said trailer 100 is configured to attach to standard vehicles and pass safety standards while lowering its overall mass, as discussed herein.

Figure 2A:
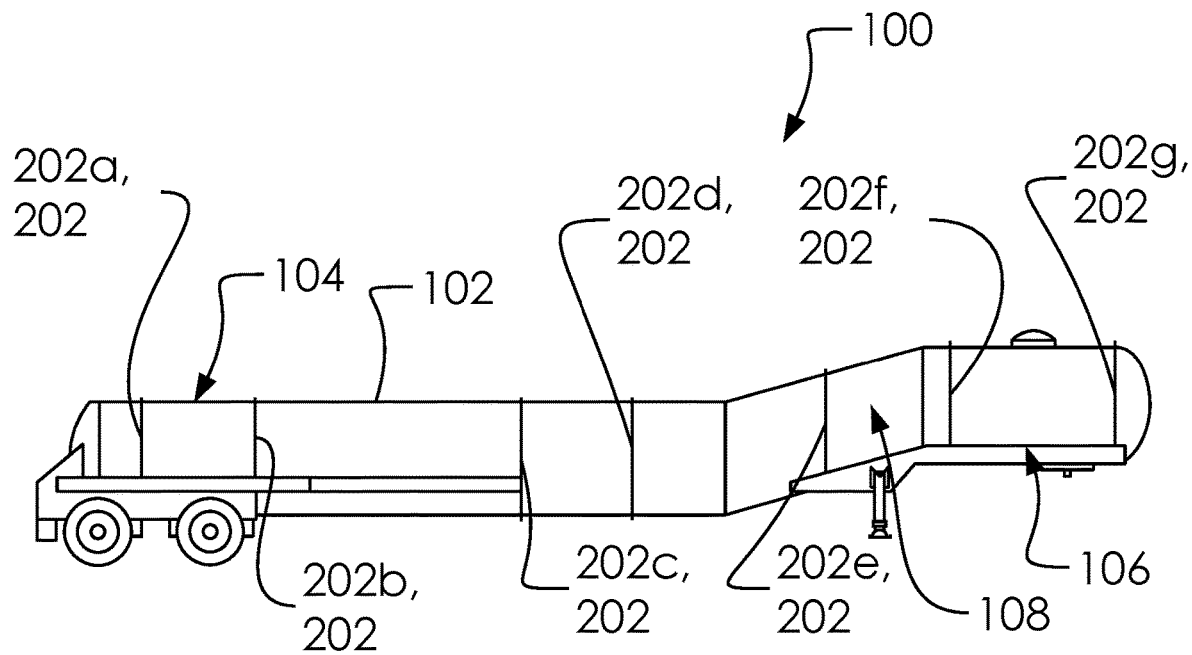
FIGS. 2A and 2B illustrate an elevated first side view of said trailer 100.
Figure 2B:
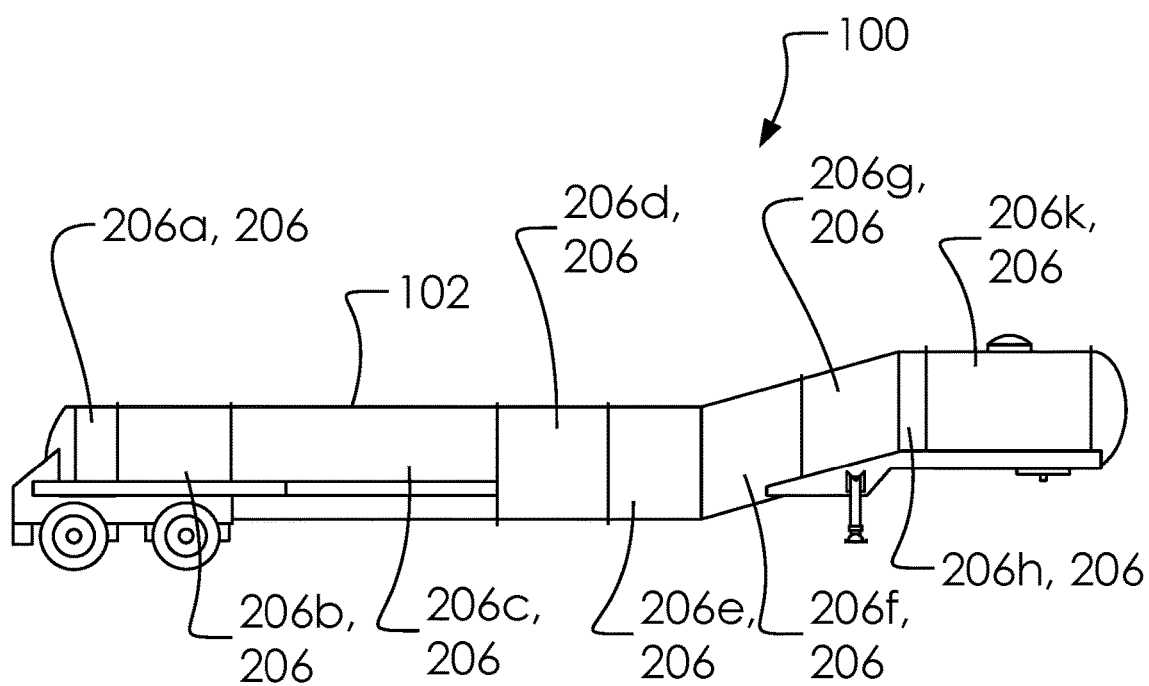

FIGS. 2A and 2B illustrate an elevated first side view of said trailer 100.

Said trailer 100 may include said plurality of sections 206 which may be integrally formed or which may be individually formed and connected together. Said plurality of sections 206 may contain said plurality of bands 202 which may extend around the periphery of said plurality of sections 206. Each of said plurality of sections 206 may be formed from metal, plastic, wood, FRP (or a combination) or other appropriate material.

Each of the above-mentioned said plurality of sections 206 can contain said plurality of bands 202 which can support said trailer 100.

Figure 3:
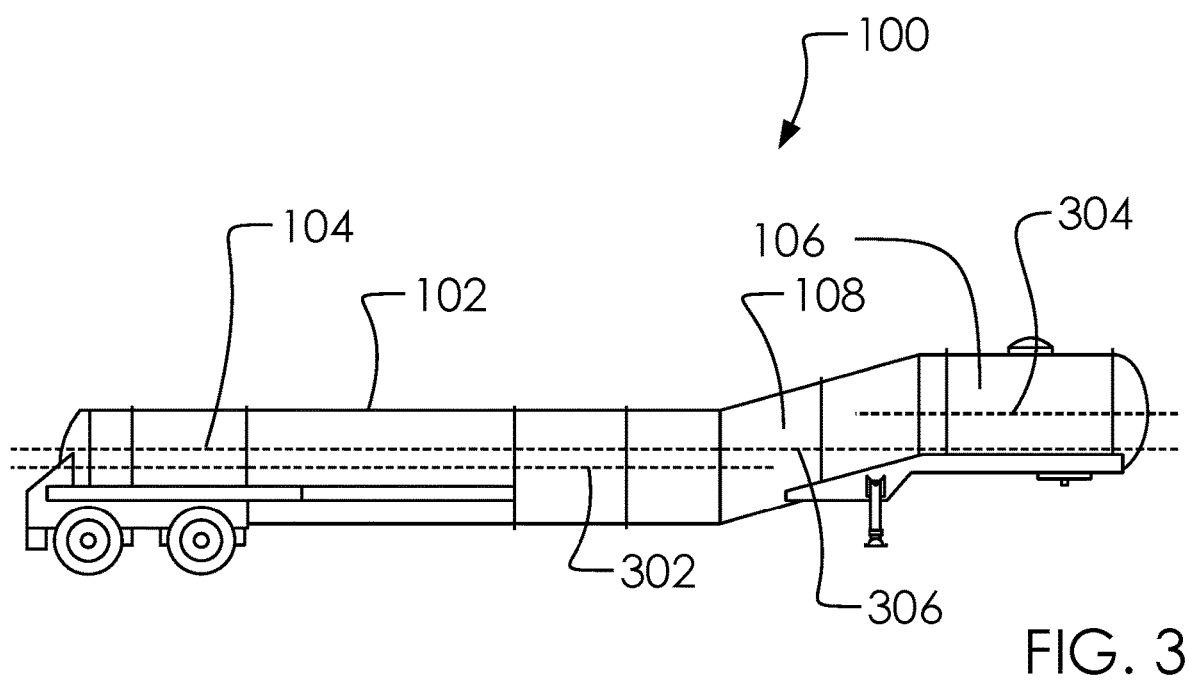
FIG. 3 illustrates an elevated first side view of said trailer 100.

FIG. 3 illustrates an elevated first side view of said trailer 100.

Figure 4A:
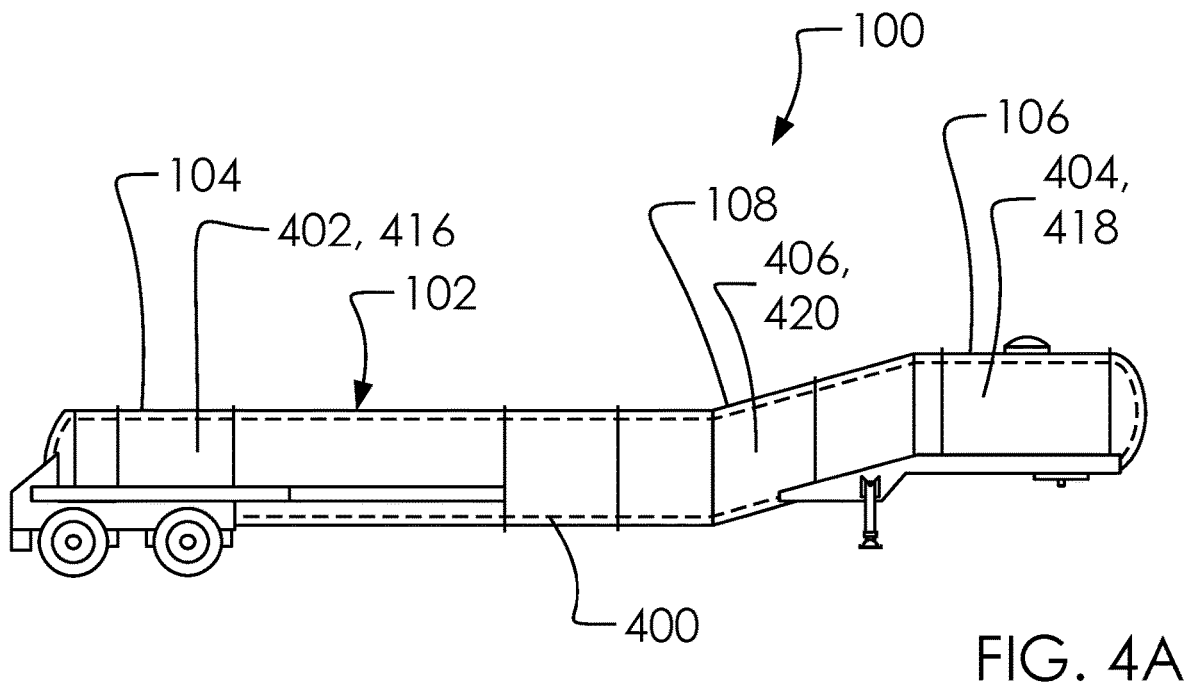
FIGS. 4A and 4B illustrate an elevated first side view of said trailer 100.
Figure 4B:
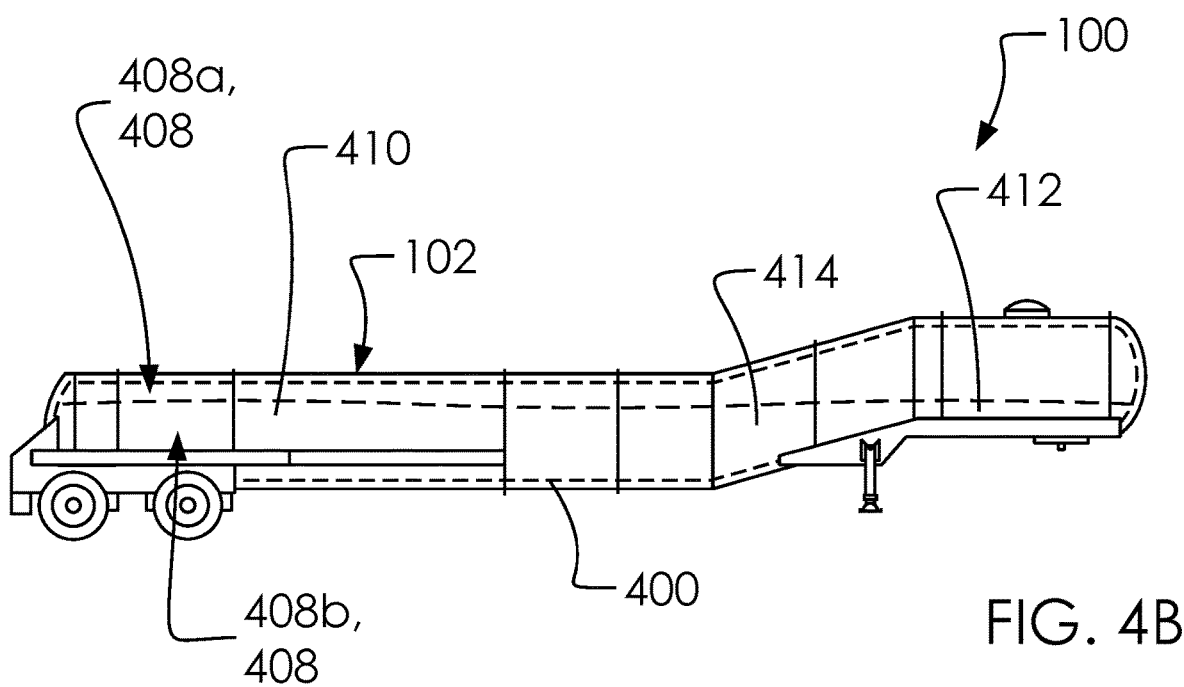

FIGS. 4A and 4B illustrate an elevated first side view of said trailer 100.

In one embodiment, said cavity 400 can contain said one or more fluids 408, as is known in the art.

One advantage of said trailer 100 over conventional tanks is the distribution of mass within said cavity 400. For example, in one embodiment, said gas fluid 408a fills an upper portion of said cavity 400 and said liquid fluid 408b fills a lower portion of said cavity 400 (as is to be expected due to the make-up of liquids and gasses). said liquid fluid 408b can settle within said cavity 400 to fill said lower cavity 402 before filling said upper cavity 404. Accordingly, said overall center of gravity 306 can be even lower and further back in said trailer 100 when said cavity 400 is partially filled with said gas fluid 408a and said liquid fluid 408b.

In another embodiment, said cavity 400 can be substantially filled with said liquid fluid 408b such that proportionately by volume said gas fluid 408a is substantially small. Wherein, said overall center of gravity 306 can be relatively low because said lower cavity 402 comprises a much larger volume than said upper cavity 404.

Figure 5:
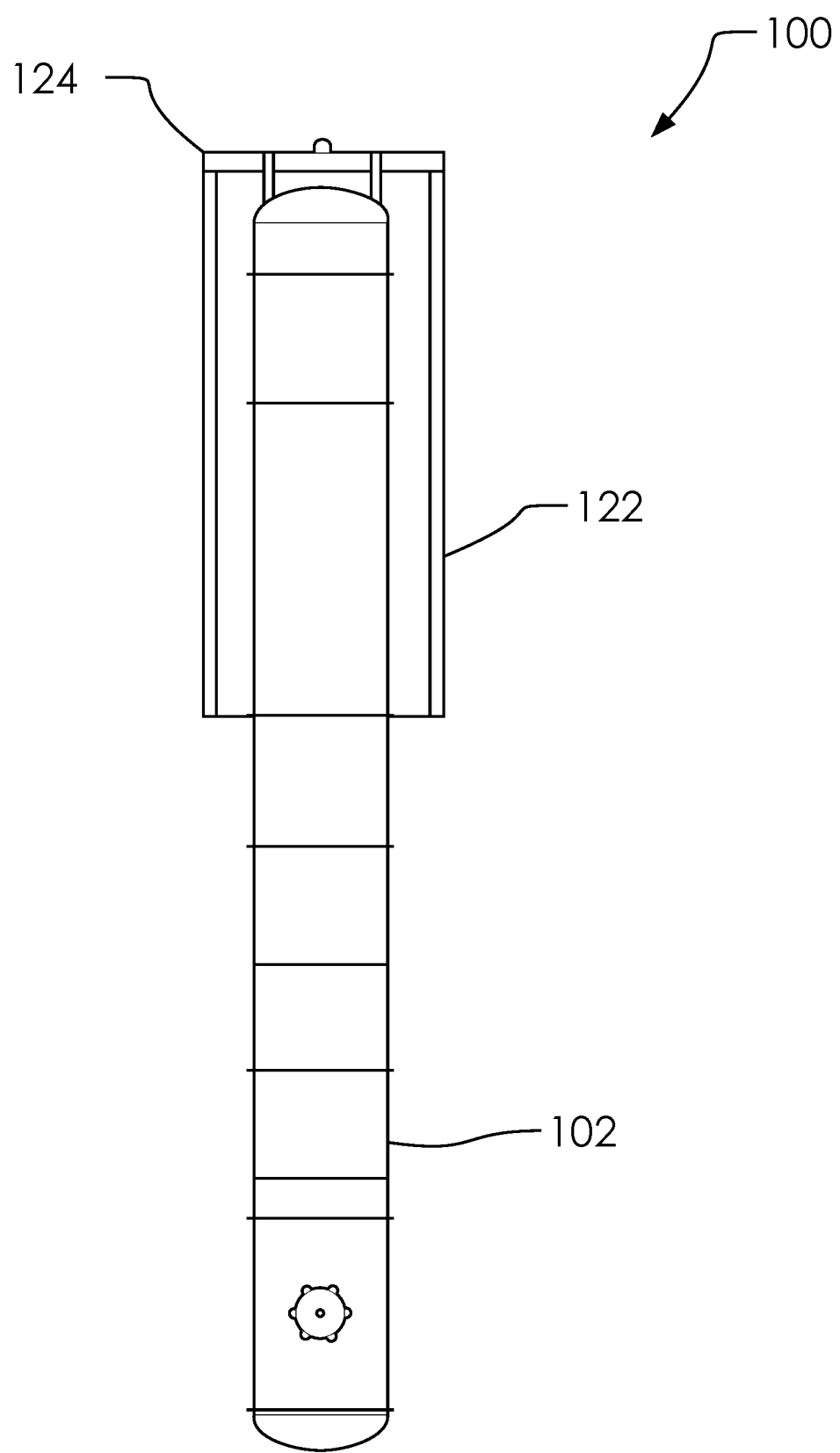
FIG. 5 illustrates an elevated top view of said trailer 100.

FIG. 5 illustrates an elevated top view of said trailer 100.

Said rear wheel fender 122 can extend on opposing sides of said trailer 100 and can extend along said tank 102 and said rear end 112.

Figure 6:
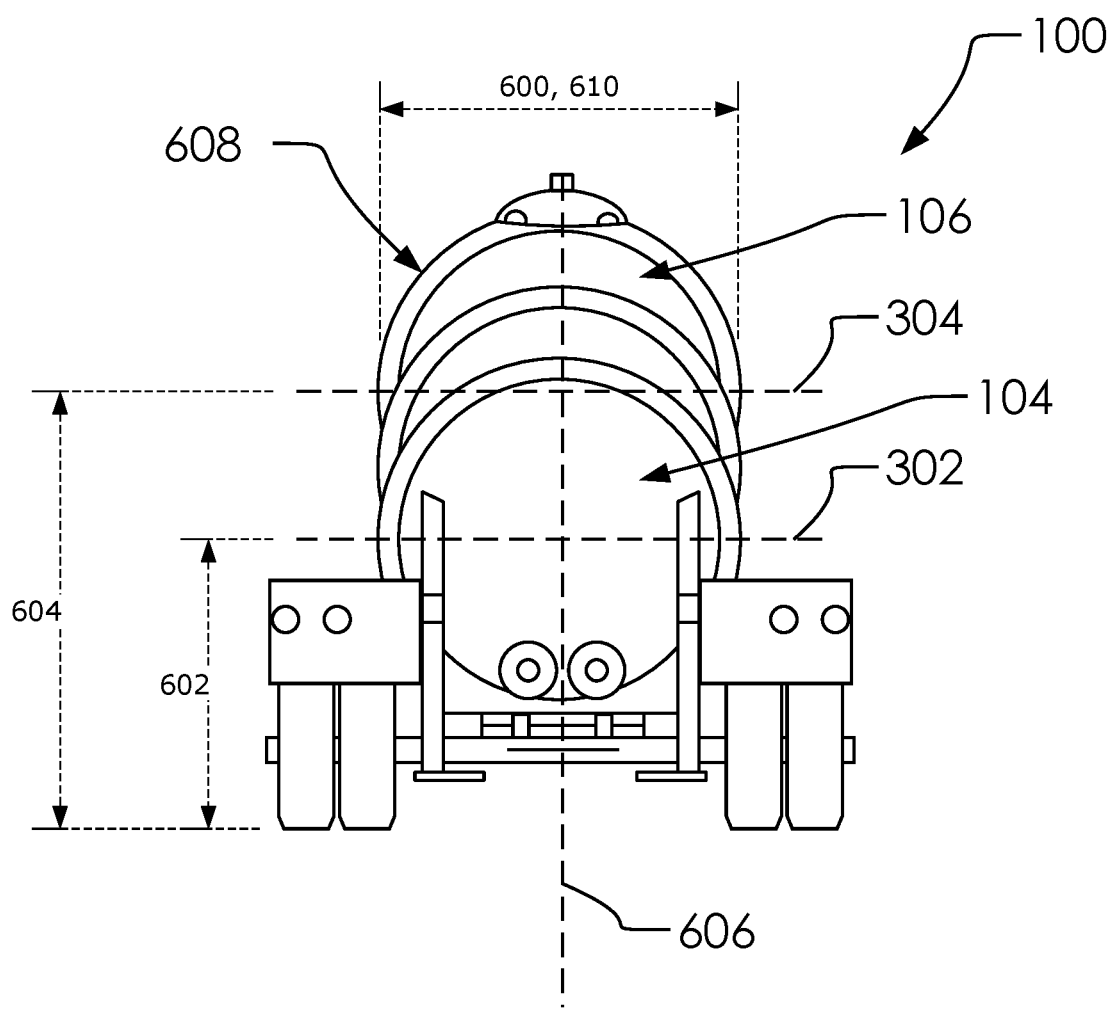
FIG. 6 illustrates an elevated rear view of said trailer 100.

FIG. 6 illustrates an elevated rear view of said trailer 100.

Said plurality of sections 206 may have a round cross-section, oval cross-section, rectangular cross-section or a combination or other appropriate cross-section shapes.

Figure 7:
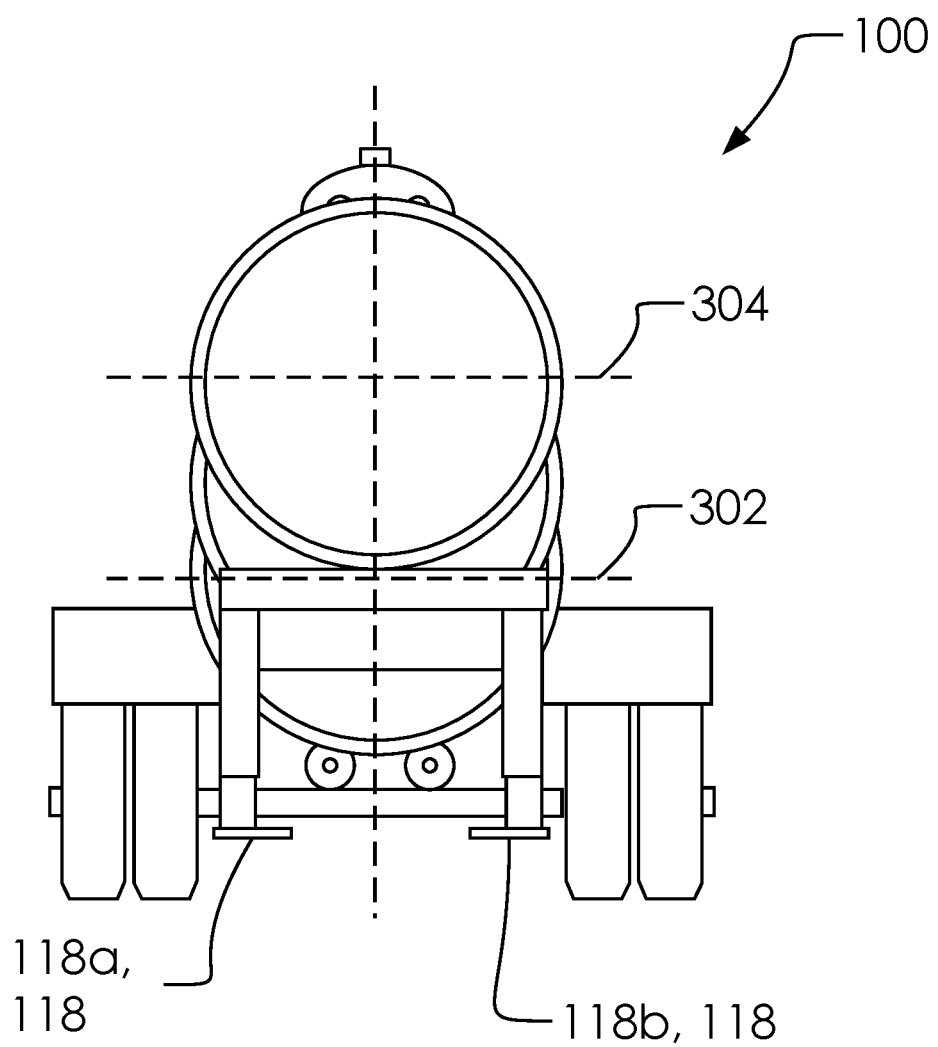
FIG. 7 illustrates an elevated front view of said trailer 100.

FIG. 7 illustrates an elevated front view of said trailer 100.

Figure 8:
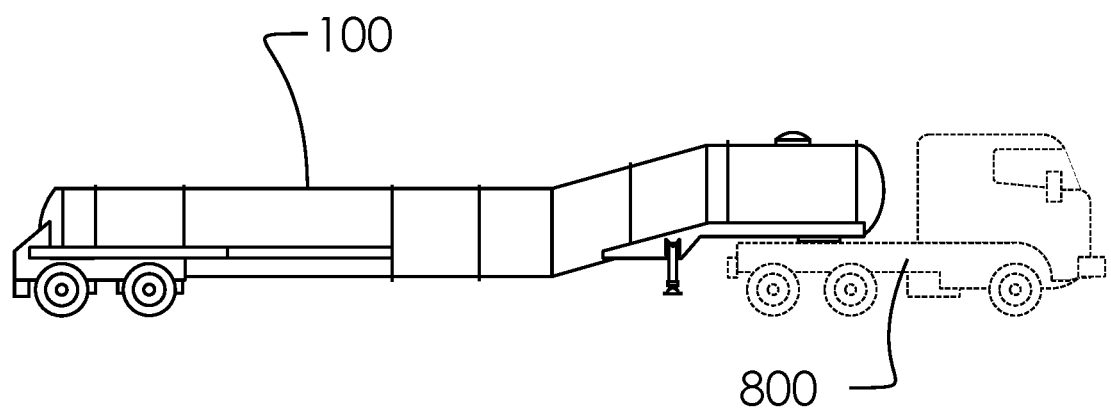
FIG. 8 illustrates an elevated first side view of said trailer 100.

FIG. 8 illustrates an elevated first side view of said trailer 100.

Said vehicle 800 is provided for illustrative purposes.

These paragraphs are provided for completeness of disclosure, with reference to the claims:

Said trailer 100 configured to lower said overall center of gravity 306. Said trailer 100 comprises said tank 102, said wheel assembly 114, said upper body height 130 and said trailer length 132. Said tank 102 comprises said cavity 400 contained within said lower body 104, said upper body 106, said transitioning body 108, said front end 110 and said rear end 112. Said tank 102 comprises said lower center of gravity 302, said upper center of gravity 304, and said overall center of gravity 306. Said lower body 104 comprises said lower body height 136, said lower body length 138, said lower body ground clearance 144, and said lower center of gravity 302. Said upper body 106 comprises said upper body length 142, said upper body ground clearance 134, said upper body height 130 and said upper center of gravity 304. Said tank 102 comprises said trailer length 132, said tank height 148 equal to said upper body height 130 of said upper body 106, and said tank ground clearance 150 equal to said lower body ground clearance 144. Said transitioning body 108 comprises said transitioning body length 140. Said cavity 400 configured to contain said one or more fluids 408. Said lower body height 136 of said lower body 104 can be lower than said upper body height 130 of said upper body 106. Said transitioning body 108 connects said upper body 106 and said lower body 104. Said upper body ground clearance 134 can be said minimum height 152 to selectively mate with said vehicle 800. Said transitioning body 108 can be inclined to connect said upper body 106 and said lower body 104. Said lower body 104 and said upper body 106 can be substantially horizontal. Said lower body 104, said upper body 106 and said transitioning body 108 each comprise a round cross-section 608 having said width 600. Said width 600 comprises a diameter 610 of said round cross-section 608. Said diameter 610 of said lower body 104, said upper body 106 and said transitioning body 108 can be equal. when said cavity 400 within said trailer 100 can be filled with said liquid fluid 408*b*, said liquid fluid 408*b* can be evenly distributed along said trailer length 132 of said trailer 100 since said diameter 610 of said lower body 104, said upper body 106 and said transitioning body 108 can be equal.

Said one or more fluids 408 comprises said gas fluid 408*a* and said liquid fluid 408*b*. Said cavity 400 comprises said lower cavity 402 in said lower body 104, said upper cavity 404 in said upper body 106, and said transitioning cavity 406 in said transitioning body 108. Said liquid fluid 408*b* can be configured to fill portions of said lower cavity 402 before filing portions of said transitioning cavity 406. Said tank 102 holds said liquid fluid 408*b* lower and further back from said upper cavity 404 by holding a greater percentage of said liquid fluid 408*b*, having a higher density than said gas fluid 408*a*, within said lower cavity 402 than a lesser percentage of said liquid fluid 408*b* within said upper cavity 404.

Said lower cavity volume 416 can be larger than said upper cavity volume 418. Said lower body length 138 of said lower body 104 can be larger than said upper body length 142 of said upper body 106. Said lower cavity 402 comprises said lower cavity volume 416. Said upper cavity 404 comprises said upper cavity volume 418. Said transitioning cavity 406 comprises said transitioning cavity volume 420.

Said transitioning body 108 comprises said incline angle 146. Said incline angle 146 comprises approximately 15 degrees. Said lower body 104 and said upper body 106 can be substantially horizontal.

each of said lower body 104, said upper body 106 and said transitioning body 108 can be substantially cylindrical.

Said round cross-section 608 for each of said lower body 104, said upper body 106 and said transitioning body 108 can be circular.

Said lower body 104 can be at a rear portion of said tank 102. Said transitioning body 108 can be at a forward portion of said tank 102 relative to said lower body 104.

Said lower body 104 can be supported by said wheel assembly 114.

Said wheel assembly 114 comprises said plurality of wheels 120. Said trailer 100 comprises said one or more legs 118. Said one or more legs 118 are configured to selectively extend and contract for support of said trailer 100.

Said tank 102 comprises said plurality of bands 202 and said plurality of sections 206.

Said cavity 400 can be sealed for selectively holding said one or more fluids 408.

Said trailer 100 further comprises said kingpin assembly 128. Said kingpin assembly 128 of said trailer 100 can be mounted below said upper body 106.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A trailer configured to lower an overall center of gravity, wherein:

said trailer comprises a tank, a wheel assembly, an upper body height and a trailer length;

said tank comprises a cavity contained within a lower body, an upper body, a transitioning body, a front end and a rear end;

said tank comprises a lower center of gravity, an upper center of gravity, and said overall center of gravity;

said lower body comprises a lower body height, a lower body length, a lower body ground clearance, and said lower center of gravity;

said upper body comprises an upper body length, an upper body ground clearance, said upper body height and said upper center of gravity;

said tank comprises said trailer length, a tank height equal to said upper body height of said upper body, and a tank ground clearance equal to said lower body ground clearance;

said transitioning body comprises a transitioning body length;

said cavity configured to contain one or more fluids;

said lower body height of said lower body is lower than said upper body height of said upper body;

said transitioning body connects said upper body and said lower body;

said upper body ground clearance is a minimum height to selectively mate with a vehicle;

said transitioning body is inclined to connect said upper body and said lower body;

said lower body and said upper body are substantially horizontal;

said lower body, said upper body and said transitioning body each comprise a round cross-section having a width;

said width of said lower body, said upper body and said transitioning body are equal; and when said cavity within said trailer is filled with a liquid fluid, said liquid fluid is evenly distributed along said trailer length of said trailer since a diameter of said lower body, said upper body and said transitioning body are equal.

2. The trailer of claim 1, wherein:
said one or more fluids comprises a gas fluid and said liquid fluid;
said cavity comprises a lower cavity in said lower body, an upper cavity in said upper body, and a transitioning cavity in said transitioning body;
said liquid fluid is configured to fill portions of said lower cavity before filing portions of said transitioning cavity; and
said tank holds said liquid fluid lower and further back from said upper cavity by holding a greater percentage of said liquid fluid, having a higher density than said gas fluid, within said lower cavity than a lesser percentage of said liquid fluid within said upper cavity.

3. The trailer of claim 2, wherein:
a lower cavity volume is larger than an upper cavity volume;
said lower body length of said lower body is larger than said upper body length of said upper body;
said lower cavity comprises said lower cavity volume;
said upper cavity comprises said upper cavity volume; and
said transitioning cavity comprises a transitioning cavity volume.

4. The trailer of claim 1, wherein:
said transitioning body comprises an incline angle;
said incline angle comprises approximately 15 degrees; and
said lower body and said upper body are substantially horizontal.

5. The trailer of claim 1, wherein:
said width comprises said diameter of said round cross-section;
said diameter of said lower body, said upper body and said transitioning body are equal; and
each of said lower body, said upper body and said transitioning body are substantially cylindrical.

6. The trailer of claim 1, wherein:
said width comprises said diameter of said round cross-section;
said diameter of said lower body, said upper body and said transitioning body are equal; and
said round cross-section for each of said lower body, said upper body and said transitioning body are circular.

7. The trailer of claim 6, wherein:
said lower body is supported by said wheel assembly.

8. The trailer of claim 1, wherein:
said lower body is at a rear portion of said tank; and
said transitioning body is at a forward portion of said tank relative to said lower body.

9. The trailer of claim 1, wherein:
said wheel assembly comprises a plurality of wheels;
said trailer comprises one or more legs; and
said one or more legs configured to selectively extend and contract for support of said trailer.

10. The trailer of claim 1, wherein:
said tank comprises a plurality of bands and a plurality of sections.

11. The trailer of claim 1, wherein:
said cavity is sealed for selectively holding said one or more fluids.

12. The trailer of claim 1, wherein:
said trailer further comprises a kingpin assembly; and
said kingpin assembly of said trailer is mounted below said upper body.

13. A trailer configured to lower an overall center of gravity, wherein:
said trailer comprises a tank, a wheel assembly, an upper body height and a trailer length;
said tank comprises a cavity contained within a lower body, an upper body, a transitioning body, a front end and a rear end;
said tank comprises a lower center of gravity, an upper center of gravity, and said overall center of gravity;
said lower body comprises a lower body height, a lower body length, a lower body ground clearance, and said lower center of gravity;
said upper body comprises an upper body length, an upper body ground clearance, said upper body height and said upper center of gravity;
said tank comprises said trailer length, a tank height equal to said upper body height of said upper body, and a tank ground clearance equal to said lower body ground clearance;
said transitioning body comprises a transitioning body length;
said cavity configured to contain one or more fluids;
said lower body height of said lower body is lower than said upper body height of said upper body;
said transitioning body connects said upper body and said lower body;
said upper body ground clearance is a height to selectively mate with a vehicle;
said transitioning body is inclined to connect said upper body and said lower body;
said lower body and said upper body are substantially horizontal; and
when said cavity within said trailer is filled with a liquid fluid, said liquid fluid is evenly distributed along said trailer length of said trailer since a diameter of said lower body, said upper body and said transitioning body are equal.

14. The trailer of claim 13, wherein:
said lower body, said upper body and said transitioning body each comprise a round cross-section having a width.

15. The trailer of claim 14, wherein:
said round cross-section for each of said lower body, said upper body and said transitioning body are circular.

16. The trailer of claim 14, wherein:
each of said lower body, said upper body and said transitioning body are substantially cylindrical.

17. The trailer of claim 13, wherein:
said lower body, said upper body and said transitioning body each comprise said round cross-section having said width;
said width comprises said diameter of said round cross-section; and
said diameter of said lower body, said upper body and said transitioning body are equal.

18. The trailer of claim 17, wherein:
a lower cavity volume is larger than an upper cavity volume;
said lower body length of said lower body is larger than said upper body length of said upper body;
a lower cavity comprises said lower cavity volume;
an upper cavity comprises said upper cavity volume; and
a transitioning cavity comprises a transitioning cavity volume.

19. The trailer of claim 17, wherein:
said one or more fluids comprises a gas fluid and said liquid fluid;
said cavity comprises said lower cavity in said lower body, said upper cavity in said upper body, and said transitioning cavity in said transitioning body;
said liquid fluid is configured to fill portions of said lower cavity before filing portions of said transitioning cavity; and
said tank holds said liquid fluid lower and further back from said upper cavity by holding a greater percentage of said liquid fluid, having a higher density than said gas fluid, within said lower cavity than a lesser percentage of said liquid fluid within said upper cavity.

* * * * *